United States Patent [19]

Kozak

[11] Patent Number: 4,571,306

[45] Date of Patent: Feb. 18, 1986

[54] SEPARATION OF LIPOPHILIC COMPONENTS FROM SOLUTIONS BY ADSORPTION

[75] Inventor: William G. Kozak, Decatur, Ill.

[73] Assignee: A. E. Staley Manufacturing Company, Decatur, Ill.

[21] Appl. No.: 604,795

[22] Filed: Apr. 26, 1984

[51] Int. Cl.$^4$ .................. B01D 15/08; B01F 17/56; C07G 3/00

[52] U.S. Cl. .................. 252/351; 210/656; 210/674; 252/DIG. 1; 252/DIG. 6; 536/4.1

[58] Field of Search .......... 252/351, DIG. 1, DIG. 6; 536/4.1; 210/656, 674

[56] References Cited

U.S. PATENT DOCUMENTS

| | | | |
|---|---|---|---|
| 2,258,168 | 10/1941 | White | 536/4.1 |
| 2,556,248 | 6/1951 | Amick, Jr. | 203/41 |
| 2,663,426 | 12/1953 | Wilson et al. | 210/690 |
| 2,913,501 | 11/1959 | Cahill, Jr. | 568/917 |
| 3,219,656 | 11/1965 | Boettner | 536/18.3 |
| 3,480,616 | 11/1969 | Osipow et al. | 536/119 |
| 3,547,828 | 12/1970 | Mansfield et al. | 252/351 |
| 3,565,885 | 2/1971 | Molotsky et al. | 536/18.6 |
| 3,598,865 | 8/1971 | Lew | 536/4.1 |
| 3,640,998 | 2/1972 | Mansfield et al. | 536/18.3 |
| 3,644,333 | 2/1972 | Osipow et al. | 536/119 |
| 3,699,182 | 10/1972 | Cattanach | 585/831 |
| 3,702,886 | 11/1972 | Argauer et al. | 423/328 |
| 4,061,724 | 12/1977 | Grose et al. | 423/335 |
| 4,277,635 | 7/1981 | Oulman et al. | 568/916 |
| 4,309,281 | 1/1982 | Dessau | 208/310 Z |
| 4,371,461 | 2/1983 | Jones et al. | 252/547 |
| 4,393,203 | 7/1983 | Mao et al. | 536/124 |
| 4,511,514 | 4/1985 | Cleary et al. | 260/419 |
| 4,521,343 | 6/1985 | Chao et al. | 260/419 |

OTHER PUBLICATIONS

The American Heritage Dictionary of the English Language, William Morris, Editor, Publ. by Houghton Mifflin Co., Boston, 1980, p. 956.

Manville Celite Filter Aids for Maximum Clarity at Lowest Cost, pp. 3-7, 26 and 27.

"Reactions on ZSM-5-Type Zeolite Catalysts", Anderson et al., Journal of Catalysis, vol. 58, pp. 114-130, (1979).

"Para-Directed Aromatic Reactions over Shape-Selective Molecular Sieve Zeolite Catalysts", Chen et al., Journal of American Chemical Society, 101:22, Oct. 24, 1979.

"Adsorption of Ethanol and Water Vapors by Silicalite", Klein et al., presented to American Institute of Chemical Engineers, Spring 1983 Meeting, Mar. 27-31, 1983.

"Union Carbide Molecular Sieves, Molecular Sieve Catalyst Data", Trade Bulletin, 12/82.

"An Evaluation of the Adsorption Properties of Silicalite for Potential Application to Isolating Polar Low-Molecular-Weight Organics from Drinking Water", Chriswell et al., PB83-148502, Jan. 1983.

"Silicalite, A New Hydrophobic Crystalline Silica Molecular Sieve", Flanigen et al., Nature, vol. 271, Feb. 9, 1978, pp. 512-516.

Primary Examiner—Richard D. Lovering
Attorney, Agent, or Firm—Philip L. Bateman; James B. Guffey; Michael F. Campbell

[57] ABSTRACT

Residual lipophilic reactants and by-products of surfactant manufacture (e.g. fatty alcohols, ethers, esters, etc.) may be adsorbed from surfactant compositions with a solid hydrophobic sorbent having pore sizes sufficiently small enough to effectively preclude molecular adsorption of the surfactant molecules therein. Surfactant compositions containing long-chain alkyl glucoside mixtures, as the major active surfactant component, may be refined to a form substantially free from lipophilic impurities by dispersing the surfactant composition into a suitable liquid carrier system and adsorbing the contaminants from the composition with the sorbent.

18 Claims, No Drawings

SEPARATION OF LIPOPHILIC COMPONENTS FROM SOLUTIONS BY ADSORPTION

BACKGROUND OF THE INVENTION

The manufacture of a surfactant composition typically produces, in addition to the desired end product, numerous residual products which can adversely affect the efficacy of the surfactant component. Such a manufacture will typically produce a host of undesirable by-products along with substantial amounts of reactant solvent excesses required for the manufacture. These residual products will normally have a deleterious effect upon surfactant functionality even though they may be present in very small or trace amounts.

The inherent functional attributes of the surfactant composition makes it extremely difficult and costly to effectively remove residual contaminants from such surfactant compositions. Consequently, surfactant manufacturers are often placed in the position to sacrifice optimal surfactant efficacy because of manufacturing difficulties and the cost considerations involved in attempting to remove such adverse contaminants from surfactant compositions.

Fatty alcohols (e.g. $C_8$–$C_{22}$ straight, branched, saturated or unsaturated, aliphatic alcohols) are extensively used as a reactant in the manufacture of surfactants. These fatty alcohols are typically reacted with a hydrophilic reactant at the appropriate molar ratios to impart the desired hydrophilic lipophilic balance (H.L.B.) to the desired surfactant composition. Residual levels of these fatty alcohols often remain as an undesirable contaminant of the manufactured surfactant composition.

The prior art has proposed a variety of means for removing such nonfunctional and deleterious residues from surfactant compositions. Extraction with complex solvent systems, washing, phase separation, distillation, centrifugation, etc. are included among the removal proposals. Although these proposed techniques may be used to partially remove residual contaminants from surfactant compositions, such methods are relatively ineffective when it is desired to remove relatively small amounts (e.g. two percent or less) of residual contaminants therefrom.

The difficulty and complexity, equipment and capital investments, energy, production of adverse decompositional by-products, labor and time, etc. considerations usually outweigh the anticipated removal benefits. The removal problem becomes particularly acute at residual contamination levels of less than 1% by weight of the active surfactant weight.

Consequently, the surfactant manufacture is typically forced into a position of leaving the residues within the surfactant composition in order to retain cost-competitive position with other functionally related surfactant compositions. The chemical and/or physical degradation of the active surfactant component arising from the removal of such residual contaminants often yield products of a substantially lower surfactant efficacy than the unrefined surfactant composition.

U.S. Pat. No. 2,663,426 issued Dec. 22, 1953 to Wilson et al discloses a process for purifying water-soluble alcohols contaminated with odorous, high-boiling hydrocarbons and sulphur compounds which arise as a result of manufacture via the hydration of mono-olefins. The Wilson et al process involves treating lower alkyl ($C_1$–$C_5$) alcohols with sand to remove the malodorous contaminants therefrom.

A patent by Cahill (U.S. Pat. No. 2,913,501 issued Nov. 17, 1959) discloses chromatographically purifying crude fatty alcohols. Cahill discloses that the fatty alcohol solution typically contains about two to fifty percent by weight impurities comprised of fatty hydrocarbons, fatty esters and fatty ethers.

Cahill then dissolves the crude alcohol in a petroleum ether and selectively adsorbs, with an activated alumina adsorbent, fatty ethers, esters and alcohols (e.g. see column 3, lines 24–34). The fatty hydrocarbon impurities remain in said solution with the petroleum ether. Cahill washes the adsorbed fatty ethers, esters and alcohols with petroleum ether to elute the fatty ethers from the adsorbent, then treats the adsorbent containing adsorbed fatty esters and alcohols with benzene or carbon tetrachloride solution to effectuate selective elution of the fatty esters. An ethanol wash is then used to elute the fatty alcohol from the adsorbent.

The petroleum industry has heretofore extensively used porous adsorbents in the manufacture of hydrocarbon products. Certain of the adsorbents possess the ability to function as sieves on a molecular scale. Such sieves, commonly referred to in the art as molecular sieves, are commercially available in a host of different forms. Molecular sieves, such as the crystalline zeolites, have been used to remove water and other polar compounds from hydrocarbon streams, to fractionate isomers and as a catalyst under conditions wherein the reactant or a reaction mixture is selectively sorbed into the pores of the molecular sieve and catalytically converted into the desired end product.

Crystalline zeolites, natural or synthetic, are chemically composed aluminosilicate minerals containing some group I or II elements. Zeolites are commercially important for their molecular sieving effects. The pore sizes of the crystalline latice is modified slightly by the cationic exchange after the synthesis of the molecular sieve. The early zeolite forms exhibited strong water adsorbent factors and, accordingly, were primarily used as adsorbents for polar compounds such as water. Molecular sieves which selectively adsorb hydrophobic molecules have been more recently introduced to the trade. These hydrophobic zeolites possess a highly uniform crystalline latice and may be effectively utilized as selective adsorbents for separating hydrocarbon isomeric mixtures in which the separated isomers may only differ in molecular size of 0.2 angstroms or less. These materials are often referred to as small pore hydrophobic adsorbents or zeolites. Characteristically, these adsorbents possess an intercrystalline sorption capacity for n-hexane far greater than that for water and thus exhibit hydrophobic properties.

Representative patents disclosing the preparation, characteristics and typical industrial applications of these hydrophobic zeolites include U.S. Pat. Nos. 4,309,281 issued Jan. 5, 1982 to Dessau, 3,699,182 issued Oct. 17, 1972 to Cattanach, 3,702,886 issued Nov. 14, 1972 to Argauer et al, 4,061,724 issued Dec. 6, 1977 to Grose et al and 4,277,635 issued July 7, 1981 to Oulman et al. The Dessau patent teaches that hydrophobic zeolites have an unusually low alumina content, i.e. high silica to alumina ratio. The hydrophobic zeolites reportedly retain their crystallinity even after prolonged exposure to steam, high temperatures and pressures. Cattanach discloses selective adsorption of p-xylene from m-xylene dispersed in a fluid carrier by contacting isomeric mixtures thereof with a hydrophobic zeolite.

U.S. Pat. No. 3,702,886 issued Nov. 14, 1972 to Argauer et al discloses a method for preparing these hydrophobic, crystalline aluminosilicate zeolites and their use in the catalytic cracking of hydrocarbon stocks at 560° F.–1100° F. and operative pressures ranging from subatmospheric to several hundred atmospheres. A publication entitled "An Evaluation of Adsorption Properties of Silicalite for Potential Application to Isolating Polar Low-Molecular-Weight Organics from Drinking Water" by Chriswell et al (National Technical Information Service, U.S. Department of Commerce, Springfield, Va., 22161, PB 83-148502) mentions that silicalite (a hydrophobic sorbent) can be used to accumulate small organic species (e.g. phenol, benzene, propanol and hexane) from aqueous solutions while conventional molecular sieves are used to accumulate water from organic solvents.

Further information relating to such hydrophobic sorbents include an article entitled "Reactions on ZSM-5-Type Zeolite Catalysts" by J. R. Anderson et al *Journal of Catalysis* 58, 114–130, (1979); "Para-Directed Aromatic Reactions Over Shaped Selective Molecular Sieve Zeolite Catalyst" by N. Y. Chen, *Journal of American Chemical Society*, 101:22, Oct. 24, 1979; a preprint of an article presented to the American Institute of Chemical Engineers, Spring 1983 meeting, Houston, Tex., Mar. 27–31, 1983 entitled the "Adsorption of Ethanol and Water Vapors by Silicalite" by S. M. Klein and W. H. Abraham; a trade bulletin entitled "Union Carbide Molecular Sieves, Molecular Sieves Catalyst", etc.

Studies by Chriswell et al upon gas phase adsorption of silicalite mention a high gas distribution coefficient on unbound silicalite at 200° C. The author's primary concern involves the removal of trace amounts of relatively small molecular weight organics from drinking water.

Further information pertaining to these hydrophobic zeolites may be obtained by reference to numerous trade publications and other information bulletins (e.g. see *Nature* 271, Feb. 9, 1978, pp. 512–517, etc.). Commercially available small pore hydrophobic adsorbents include ZSM-5 manufactured by the Mobil Oil Corporation and Silicalite S-115 manufactured by Union Carbide Corporation. The most commonly available forms of these hydrophobic zeolites are presently reported to possess an open pore structure and contain a multiplicity of channels measuring six angstroms in diameter ($\pm 0.2$A) that occupy approximately one-third of the total crystal volume. Their decompositional temperatures are reported to exceed 1100° C., and they are stable in the presence of most solvents and corrosives including strong acids and oxidizing agents. Other synthetic hydrophobic zeolite forms with a uniform channel structure of differing molecular dimensions have also been reported by the art.

Adsorption techniques relying upon other different types of sorbents have also been proposed. U.S. Pat. No. 2,556,248 issued June 12, 1951 to Amick discloses an aqueous process for purifying ethers by distillation and adsorption with silica gel. According to Amick the water and lower alkyl alcohol impurities remain with the solvent system while the lower alkyl ether is absorbed by the silica gel. U.S. Pat. No. 3,565,885 issued Feb. 23, 1971 to Molotsky et al disclose a process for preparing color stable glycosides. Molotsky et al proposes the use of a strongly basic anionic exchange resin (hydroxy form or weakly anionic form other than phenolic-formaldehyde based resins) to remove adverse color-producing bodies such as reducing sugars from lower alkyl glycoside mixtures.

The inventor herein was confronted with a problem of removing relatively small amounts (e.g. 2% or less) of fatty alcohol and fatty by-product residues from surfactant compositions. The inventor recognized that the prior methods became progressively ineffective as the concentration of fatty alcohol and by-product contaminants within the surfactant composition became more diluted (1% or less). The problems associated with the removal of lipophiles from surfactant compositions are much more difficult and complex than those customarily encountered in most purification processes. These problems are compounded by the uniquely different and inherent properties of the surfactant component and its tenacious associative effect upon lipophilic contaminants within the surfactant composition. A unique process permitting the surfactant manufacturer to effectively remove such residual contaminants without degrading the surfactant component would significantly enhance the overall efficacy of the surfactant composition. Such a process would be particularly useful if it could be accomplished on a cost-effective basis.

Throughout the specification, percentages and ratios are by weight, pressures are atmospheres over ambient and temperatures are in degrees Celsius unless otherwise indicated.

SUMMARY OF THE INVENTION

A method for removing lipophilic residues from a surfactant composition comprised of surfactant molecules, lipophilic residue molecules of a molecular dimension less than the surfactant molecules and an effective amount of a liquid carrier to permit the adsorption of said lipophilic molecules from said surfactant composition with a hydrophobic adsorbent, said method comprising:

(A) contacting said surfactant composition with a solid hydrophobic sorbent characterized as having pore dimension sufficiently small to effectively preclude molecular adsorption of the surfactant molecules;

(B) selectively adsorbing at least a portion of said lipophilic molecules from said surfactant composition; and (C) partitioning the adsorbent containing the adsorbed lipophilic molecules from the surfactant composition to provide a surfactant composition of a reduced lipophilic residue content.

DESCRIPTION OF THE INVENTION

The method of the present invention effectively removes extremely dilute residual lipophilic contaminants from surfactant compositions. Th present process affords a means of efficiently removing lipophilic residues even though they are present in the surfactant composition at levels of 2% by weight or less.

In practice, the extent by which such lipophilic residues are removed from any surfactant composition will primarily depend upon the specifications and requirements of the particular manufacturer. Such requirements may vary considerably and often depend upon the specific surfactant and the ultimate intended end usage. The method herein is readily adapted to removing lipophilic residual contaminants at concentrations of less than 1% of the total active surfactant weight. This process provides the means whereby a surfactant manufacturer can now produce a refined surfactant composition essentially free (e.g. less than 0.05% by weight of the total surfactant composition weight) from lipophilic residue contaminants.

Residual contaminants which may be readily removed from surfactant compositions under the present invention include the fatty ethers, the fatty alcohols and the fatty esters. Such residual contaminants are inherently present in most commercial grades of surfactant compositions and are common by-products produced in the manufacture of the surfactant composition. The difficulties in removing such residues becomes progressively more difficult, under conventional processes, as their concentration within the surfactant composition is progressively reduced below the 3% by weight level.

These residual contaminants characteristically contain long-chain moieties (e.g. alkyl or alkenyl of $C_8$–$C_{32}$ atoms) but possess insufficient hydrophilicity for surfactancy. A major weight portion of the residues normally present in surfactant compositions may be compositionally represented by the structural formula: $R_fOH$, $R_fOR_1$ and $R_1AR_f$, wherein "$R_f$" comprises a hydrocarbyl moiety containing a straight carbon chain of at least 6 carbon atoms, "$R_1$" represents a derivatized or underivatized hydrocarbyl moiety (e.g. $C_1$–$C_{32}$ atoms) and "A" an acid residue moiety such as obtained from the esterification of a fatty alcohol with an organic acid.

Effective removal and separation of lipophilic residue from surfactant compositions herein relies upon a hydrophobic sorbent characterized as having a pore size which will selectively adsorb lipophiles of a minimum molecular dimension less than the pore size of the adsorbent. The active surfactant components of the surfactant composition should generally have a minimum molecular dimension greater than the pore size of the adsorbent. This will permit the hydrophobic sorbent to selectively adsorb the undesirable residues at the exclusion of the functional surfactant component.

Thus, the pore size of the sorbent may be selected upon the basis of the minimum molecular dimension of the active surfactant component. Surfactant molecules of larger molecular sizes will generally permit a larger adsorbent pore size to be used with a concomitant adsorption of larger sized lipophiles therefrom. The most commonly reported hydrophobic sorbents are comprised of porous channels with an adsorptive capacity for hydrophobes measuring less than 15 angstroms (e.g. 6–13 A) in size. Hydrophobic sorbents of a pore size of less than 10 angstroms (e.g. 6–9 A), however, are generally adaptable for most applications herein. The most commonly available hydrophobic zeolites which have molecular pores of a minimum dimension measuring 6 angstroms have been found to be particularly effective sorbents.

Any liquid carrier for the lipophilic residues which: (a) is too polar for strong adsorption, (b) has a minimum molecular dimension greater than the adsorbent pore dimension and/or (c) has a significantly low adsorption rate so as to not compete with the lipophilic residue adsorption may generally serve as a liquid carrier herein. The liquid carrier should be sufficiently chemically inert so that it does not adversely affect the functionality of the active surfactant component. The adsorption may be conducted with either polar or non-polar liquid carriers as well as combinations thereof.

The liquid carrier provides a suitable media for the transport of the lipophilic residue in the void spaces of the hydrophobic sorbent. Advantageously, an effective amount of a liquid carrier sufficient to uniformly or homogeneously disperse the lipophilic and surfactant molecules throughout the surfactant composition will be incorporated into the adsorption media. It is unnecessary for the lipophilic residue to be completely soluble in the liquid carrier. However, the liquid carrier preferably serves as a dual solvent for the residual lipophiles and the active surfactant component.

Inert, non-polar, organic solvents of a minimum molecular dimension greater than the adsorbent may serve as a liquid carrier. Standard molecular models or molecular size determination techniques (e.g. see *Journal of Catalyst* 58, 114–130, 1970 by J. R. Anderson et al) can be used to ascertain the minimum molecular dimensions of any surface active agent or liquid carrier. Benzene, monosubstituted benzenes, para-substituted benzenes, normal or iso-alkanes or alkenes, cyclohexane, are illustrative non-polar, hydrocarbon solvents which characteristically possess a molecular dimension of less than six angstroms. These organic solvents will usually competitively interfere with the lipophilic residue adsorption in a 6 A sized hydrophobic sorbent system. Conversely, substituted and unsubstituted hydrocarbons which contain a tertiary carbon group or an aromatic substituted in the meta- or ortho-position (e.g. o- or m-substituted xylene) will not normally compete in such an adsorption process because they have a molecular size greater than 6 A.

Representative non-polar solvents for hydrophobic sorbent of a dimensional size of greater than 6 A include the substituted and unsubstituted hydrocarbons which contain a tertiary carbon, tertiary amino group, or quaternary amine, the ortho and meta polysubstituted aromatics, naphthalenes, polycyclic aromatics and naphthenes, e.g. tripropylamine, tricaprylmethylammonium chloride, 1,1,4-tripropyl cyclopentane, 2,2,4-trimethyl pentane, t-butanol, decalin, anthracene, mixtures thereof and the like. See also U.S. Pat. Nos. 3,699,182 issued Oct. 17, 1972 to Cattanach, 4,309,281 issued Jan. 5, 1982 to Dessau et al, etc.).

Other illustrative non-polar organic solvents of a molecular size greater than six angstroms include saturated and unsaturated hydrophobic hydrocarbons of a similar molecular configuration which contain halo (e.g. F, Cl, Br, and I), acetoxy, acetal, phenoxy, carbonyl, alkylene dioxy, nitro, oxy, sulfonyl, sulphates, etc. substituents. The halogenated hydrocarbons (especially the perhalogenated hydrocarbons) may be utilized to particular advantage as a liquid carrier. Substances normally a gas or solid at ambient conditions may be suitably converted into a liquid under the adsorption conditions and used as a liquid carrier herein.

The hydrophobicity of the sorbent allows polar solvents to be used as a suitable liquid carrier in the adsorption of lipophilic residues. A wide variety of polar solvents may be utilized as a liquid carrier in the removal and separation of the residual contaminants from surfactant compositions. The sorbents possess sufficient hydrophobicity to permit the utilization of polar solvents or carriers of a molecular size greater or less than the porous channels of the hydrophobic sorbent.

Included among representative polar solvents are water, polyhydric alcohols, ethylene glycol, glycerine, glycols and polyols, mixtures thereof and the like. The preferred liquid carrier is water. Water may be used as the principal (meaning more than any other liquid carrier on a weight basis), major or sole liquid carrier in the adsorption process. Aqueous solutions comprised of water and other water-soluble organic solvents may be suitably combined to provide the liquid carrier system.

The most appropriate weight proportion of liquid carrier to surfactant composition solids for any adsorption system will largely depend upon the efficacy of the particular liquid carrier system. For most operations, the weight ratio of liquid carrier to surfactant composition solids (d.s.b.) will normally range from about 1:4 to about 4:1 and most typically from about 1:3 to about 3:1. When aqueous systems are utilized as a liquid carrier, a liquid carrier to surfactant composition solids weight ratio ranging from about 2:1 to about 1:2 (preferably from about 2:3 to about 3:2) will afford a suitable adsorptive media for most refining operations.

The purification process of this invention may be effectively utilized to remove residual contaminants from a wide variety of diverse surfactant compositions. It generally applies to the purification of anionic, nonionic, amphoteric, zwitterionic, cationic surfactants, mixtures thereof and the like.

Typical commercially available surfactant compositions of the anionic type include the water-soluble neutralized salts (e.g. alkali or alkaline earth metals, ammonium, and amine salts) of sulfonic and/or sulfuric acid radicals which contain a long-chain alkyl radicals of about 8–22 carbon atoms. Representative anionic surfactant compositions include the alkenyl, alkyl benzene or alkyl toluene sulfonates, the paraffin sulfonates, the alkyl glyceryl ether sulfonates (e.g. formula of: $RO(C_2H_4O)_xSO_3M$ wherein "R" is an alkyl or an alkenyl moiety of about 10–20 carbon atoms, "x" is an integer ranging from about 1–30 and "M" is a water-soluble cation such as sodium), the disulfonates and disulfates thereof, etc, and the like.

Representative nonionic surfactants include the ethylene oxide condensation product of: (a) long-chain aliphatic alcohols having either a straight or branched chain aliphatic moiety containing about 8–22 carbon atoms, (b) the alkyl or alkenyl phenols containing alkyl groups of about 6–12 carbon atoms (straight or branched chain configuration) and (c) the amide nonionics such as the ammonium, monoethanol and diethanol amides of fatty acids having an acyl moiety of about 8 to about 18 carbon atoms (e.g. coconut oil, palm oil, soybean oil, and tallow, etc.), mixtures thereof and the like.

Other illustrative nonionic surfactant compositions include those obtained by condensing fatty alcohols with polyfunctional hydric compounds such as ethylene glycol, propylene glycol, diethylene glycol, dipropylene glycol, the butanediols, hexanetriol, glycerol, trimethylolpropane, trimethylolethane, hydroquinone, pentaerythritol, sorbitol, sucrose epoxides, etc. The fatty alkyl ester surfactants prepared by reacting polyhydric alcohols with fatty alcohols (e.g. see U.S. Pat. Nos. 3,644,333 issued Feb. 22, 1972 to Osipow et al and 3,480,616 issued Nov. 25, 1969 to Osipow et al) illustrate other surfactant compositions often contaminated with lipophilic residues.

In addition to anionic and nonionic surfactant compositions, amphoteric surfactants, zwitterionic surface active agents, cationic sufactants and other surfactant compositions which contain undesirable lipophilic contaminants may be refined to a higher level of active surfactant components under the processing conditions of this invention.

The method is particularly effective in purifying and removing lipophilic residues from long-chain or fatty aldoside mixtures. These long-chain hydrocarbyl aldoside surfactants are typically prepared by the condensation of glucose or glucose-containing carbohydrates with fatty alcohols. The lower alkyl glycosides such as butyl glycoside, are often used as an intermediate for the fatty alcohol interchange.

The active surfactant component of such long-chain alkyl surfactant compositions include those surface active agents generally represented by the structural formula: $R_fO(G)_n$ wherein "$R_f$" represents a lipophilic organo group containing a straight-chain or hydrocarbyl group of at least 6 carbon atoms; "G" is an aldosidic unit (preferably a glucosidic unit) and "n" is a number having a value of at least 1. The long-chain alkyl glycoside surfactants are comprised of a mixture of glycosides which vary in glycosidic chain length. Thus, in the formula, "n" represents the glucosidic unit average of the mixture. Although "n" may have a value of more than 50, surfactancy efficacy is generally provided when the value of "n" is less than 10. Advantageously, "n" for the long-chain alkyl glycoside applied to this invention will have a value of less than 5 and most preferably "n" will have an average value within the 1 to 3 range.

Illustrative "$R_f$" groups include the alkoxy residue of primary or secondary long-chain alcohols, saturated or unsaturated alkyl or alkylaryl groups, polyoxyalkylene or arylene ether groups, cyclic or heterocyclic organo groups, mixtures thereof and the like. Exemplary alcohols useful in preparing fatty glycoside surfactant compositions include octyl alcohol, nonyl alcohol, decyl alcohol, eisocanol, dodecyl alcohol, tridecyl alcohol, tetradecyl alcohol, pentadecyl alcohol, hexadecyl alcohol, heptadecyl alcohol, 5,8,11,14-eicosatetraenol, octadecyl alcohol, dodecanol, pentacosyl alcohol, oleyl alcohol, 2-methyl, 7-ethyl-4-undecanol, 9-octadecanol, 9,12-octadecadienol, 9,12,15-octadecatrienol, mixtures thereof and the like.

The lipophilic alcohols used to prepare the condensate products will advantageously have a molecular weight ranging from about 140–300. Alcohols containing a primary group of about 8–18 carbon atoms (especially the 10–14 carbon atoms) are particularly useful in preparing these fatty organo glycosides. Illustrative patents disclosing the preparation of such fatty glycosides include U.S. Pat. Nos. 3,219,656 issued Nov. 23, 1965 to Boettner; 3,598,865 issued Aug. 10, 1971 to Lew; 3,640,998 issued Feb. 8, 1972 to Mansfield et al; 3,547,828 issued Dec. 15, 1970 to Mansfield et al and 4,393,203 issued July 12, 1983 to Mao et al.

The surfactant compositions mentioned hereinbefore set forth general classes of surface active agents or detergents which may be subjected to the purification process of this invention. The invention broadly applies to surfactant compositions within these general classifications of surfactants. Further information for a listing of specific surface active agents may be obtained by referring to U.S. Pat. No. 4,371,461 issued Feb. 1, 1983 to Jones et al and *McCutcheon's Emulsifiers and Detergents,* 1983 North American Edition, published by McPublishing Company, 175 Rock Road, Glen Rock, N.J., 07452 (both of which are incorporated herein by reference) as well as other available trade bulletins and publications.

If relatively large amounts of lipophilic residues are present in the crude surfactant composition, conventional processes (e.g. distillation, washing, phase separation, solvent extraction, etc.) may be utilized to partially remove such lipophilic residues. The partially refined surfactant composition may then be subjected to the adsorption and separation process herein to further reduce the lipophilic residue content to an acceptable level.

The lipophilic residue molecules of a molecular dimension smaller than the surfactant molecules are removed by contacting the surfactant composition with an adsorbent generally having pore sizes smaller than the surfactant molecules. The solid hydrophobic sorbent adsorbs the small lipophilic residue molecules while leaving the larger surfactant molecules unadsorbed by the system. The selective adsorption of lipophilic residue molecules at the exclusion of surfactant molecules involves the use of a hydrophobic adsorbent having a pore dimension small enough to preclude the adsorption of the surfactant molecules.

The molecular dimensional differences between the surfactant molecules and the major residual molecules generally permit this selective adsorption. The most appropriate pore size of the hydrophobic sorbent for any given surfactant composition will depend primarily upon the molecular dimensions of the surfactant molecules and the particular residual molecules to be removed therefrom. The uniformity and technology available for varying the adsorbent pore sizes provides a means for altering the specificity of a hydrophobic sorbent to suit the selective removal of specified residual species from the surfactant composition.

For most surfactant compositions, hydrophobic sorbents having minimum pore dimensions within the 6–8A range afford an effective means for removing residual lipophiles therefrom. Hydrophobic sorbents characterized as having a molecular dimension of about 6A in size have been found to be particularly effective for removing the predominant fatty alcohol and fatty ester contaminants from most conventional surfactant compositions. Such hydrophobic sorbents possess a high degree of efficacy in removing small or trace amounts of residual contaminants from surfactant compositions and particularly for removing such residues from the long-chain alkyl glycosides.

The operative temperature may be suitably varied to maintain the carrier in a liquid state under the adsorption conditions herein. The most appropriate temperature will generally depend upon the pressure as well as the physical and/or chemical compositional characteristics of the active surfactant component, the residue and the solvent system. Although the sorbent properties permit operational temperatures to range from cryogenic (e.g. −100° C. or less for gases) up to 600° C. or higher, the adsorption rate, physical and/or degradation to the active surfactant component, liquid carrier system, etc., generally favor the operating temperature to be conducted within about a 0° C. to about 200° C. range. The optimum temperature in a commercial operation for the adsorption of the residual contaminants will normally range from about 20° C. to about 150° C. and most typically from about 50° C. to about 100° C.

The adsorption may likewise be operatively conducted over a broad range of pressures ranging from subatmospheric to superatmospheric pressures. This permits, in addition to liquid solvents, the surfactant manufacturer to convert normally gaseous or solid carriers (simply through the appropriate regulation of pressure and/or temperature) into a liquid carrier form for the adsorption step herein. Illustrative pressures may range from about 1 atmosphere to about 25 atmospheres. The operative adsorption pressure will advantageously range from about 0.5 to about 10 atmospheres with pressures ranging from about 1 to about 5 atmospheres being typically applied to most operations.

Factors such as the adsorptive media and conditions will affect the rate and capacity of the sorbent to accumulate the residual species. The porosity and crystalline structure for different hydrophobic sorbent species will also affect the adsorptive efficacy. Levels ranging from about 1 to about 60 cubic centimeters of hydrophobic adsorbent crystal for each cubic centimeter of adsorbable residue are generally adaptable to most operations.

It is usually advantageous to increase the adsorbent amount to a level higher than the optimum adsorption capacity for any given hydrophobic adsorbent. For example, the 6A hydrophobic sorbents typically have a capacity to adsorb a volume of residue for each 3 volumes of sorbent crystal. Residue removal is, however, enhanced when higher sorbent levels (e.g. at least 4 cc sorbent crystal/cc residue) are used to adsorb the residue. Amounts of hydrophobic sorbent ranging from about 4 to about 20 cc crystal for each adsorbed residue cc will generally suffice for most commercial operations.

The adsorption may be conducted under batch, semi-continuous or continuous processing conditions. Advantageously, the adsorption process will be conducted in a fixed bed of sorbent contained within suitable vessels equipped with appropriate feed and effluent ports, temperature and pressure control systems. The adsorption system is also desirably equipped with an analytical measurement device which monitors the residual contaminant level in the effluent and means to regulate the feed flow rate, bed residence time, etc. The adsorption of the residual contaminants is generally conducted for a period of time sufficient to measurably reduce the contamination level of the effluent residue level.

The adsorption step will advantageously be used to reduce the residue level to less than about 0.5% by weight (based upon total surfactant weight) and most preferably to a level of less than 0.1% by weight. If desired, a series of fixed adsorbent beds may be appropriately utilized to continuously remove residual contaminants from the surfactant composition. Back-up fixed beds may also be placed in operation when it becomes necessary to elute the residual contaminants from the adsorbent.

The adsorbent continues to adsorb residual contaminants until it becomes occluded with the adsorbed species. Upon reaching an equivalent volume of adsorbed species, regeneration is then generally required to restore an occluded adsorbent to a productive adsorption level. A plurality of desorption techniques (e.g. volatilization through vacuum and/or heating above the boiling point of the residue, extraction or washing, selective elution with an inert gas or liquid, chemical or physical degradation, etc.) may be used to effect desorption and regeneration thereof.

The hydrophobic zeolites generally possess sufficient structural strength and chemical inertness to permit a broad range of desorption techniques. Accordingly, the hydrophobic adsorbent may be subjected to a broad pressure fluctuation (subatmospheres to superatmospheres) and thermal conditions to facilitate desorption of the accumulated residue. Temperatures ranging from about −50° C. up to 500° C. and higher may be utilized, if desired, to desorb residual contaminants. The desorption pressures and temperatures will most typically and respectively fall within about 0.1 to about 5 atmospheres and about 0° to about 300° C.

Alternatively, adsorbable gases or liquids can be used to displace the previously adsorbed lipophilic residues prior to the desorption step. In the case of normally gaseous substances, pressurized systems may be applied to maintain the gas in a liquid form. Conversely, solids (at 20° C.) can be converted into a suitable liquid desorbent by conducting the desorption at liquefying temperatures. The regeneration and residue removal may also be conducted under conditions wherein the adsorbed residue is chemically and/or catalytically converted into a more readily eluted form such as a gas or a more polar reaction product.

Advantageously, the residue removal will be ultimately accomplished by physically separating the solid adsorbent containing the adsorbed residue from the surfactant composition and treating the hydrophobic adsorbent with a gaseous or liquid eluent. Chemically inert gases such as argon, nitrogen, air, carbon monoxide, carbon dioxide, xenon, hydrocarbons (e.g. methane, ethane, propane, butane, isobutane, isopentane, n-pentane, propylene, etc.) hydrocarbyl ethers, (e.g. dialkyl ethers such as dimethyl and methylethyl ether, etc.) hydrocarbyl esters, mixtures thereof and the like, convertible into a liquid under the desorption conditions may be used as purging or displacing gases.

Liquid desorbents or solids convertible into liquids under the residue desorptive conditions herein may also be used to regenerate the adsorbent. Such desorbents are characterized by having a molecular size of less than the sorbent pore and often a greater adsorptive affinity and/or higher vapor pressures than the residual contaminants. Illustrative liquid eluents include the saturated and unsaturated aliphatic hydrocarbons, the saturated and unsaturated aliphatic oxygen derivatives, the saturated and unsaturated aliphatic halogen derivatives, alicyclic hydrocarbons, aromatic hydrocarbons, halogenated aromatics, the oxygen aromatic derivatives, heterocyclic compounds, etc. mixtures thereof and the like.

More specific illustrations thereof include organic solvents such as the $C_1$-$C_6$ monohydric alcohols (e.g. methanol, ethanol, propanol, butanol, amyl alcohol, hexyl alcohol), ethyl acetate, methyl propionate, ethyl propionate, ethyl formate, methyl butyrate, bromobenzene, toluene, p-xylene, acetone, methyl ethyl ketone, diethyl ketone, methyl butyl ketone, chloroform, dichloromethane and ethane, carbon tetrachloride, ethylene dichloride, ethylene difluoride, ethylene dibromide, amyl chloride, hexyl chloride and butyl chloride. Alkanols of 2 to 5 carbon atoms inclusive and particularly butanol are preferably used as eluents herein.

These alcohols are extremely effective in removing the occluded residues from the adsorbent and permit, if desired, the eluent stream to be directly recycled within the manufacturing process. The recycled fatty alcohol is thereby effectively used in the manufacture of the surfactant composition.

The method for removing undesirable lipophilic residues from contaminated surfactant compositions is extremely effective. The tenacious attraction and similarity between the residue molecules and the surfactant molecules has heretofore prevented the effective and pragmatic removal of residues from contaminated surfactant compositions. Exhaustive liquid/liquid extraction and liquid/solid studies would tend to provide evidence that it would not be possible to effectively remove residual contaminants from surfactant compositions in a commercial operation. The efficacy of the hydrophobic sorbents (especially the 6–8A sorbents) in effecting this separation on a cost-effective basis is most unexpected in view of these prior art findings and conclusions.

The following examples are illustrative of the invention.

EXAMPLE 1

This example illustrates the use of a silicalite powder (Union Carbide S-115), a silica polymorph, to remove fatty contaminants from a surfactant composition which contains long-chain alkyl glycosides as the active surface agent. The long-chain alkyl glycoside component consists essentially of dodecyl and tridecyl glycoside mixtures represented by the structural formula: $R_fO(G)_n$ wherein "$R_f$" represents either a dodecyl or tridecyl moiety with about 50% of the molecules within the mixture bearing the dodecyl substituent and the balance (i.e. 50%) bearing the tridecyl substituent, "G" represents a glucosidic unit and "n" represents the average number of glucosidic units for the molecular mixture. The average number of glucosidic units for the glycoside mixture was 3.0. Surfactant compositions of this type may be obtained by the methodology disclosed in U.S. Pat. No. 4,393,203 issued July 12, 1983 to Mao or other fatty glycoside preparatory methods referenced to hereinbefore. The surfactant composition subjected to the adsorption process of this example consisted of 48.61% by weight water (the liquid carrier) and 51.39% by weight dry solid substance of which 99.29% consisted of the long-chain alkyl glycoside component with the balance (0.71%) being comprised of tridecyl and dodecyl alcohols.

In Run A of this example, a 10 gram aliquot of the aforementioned solution was mixed with 1 gram of the silicalite and allowed to quiescently remain under ambient conditions (20° C. and 1 atmosphere) for one day. The silicalite was physically separated from the solution by filtering through a #2 filter paper. The resulting filtrate was then subjected to high pressure liquid chromatography analysis. Run A filtrate analysis revealed about a 40% fatty alcohol residue reduction (from 0.71 to 0.44% fatty alcohol) without any appreciable removal or alteration of the active surface agent component from the filtrate.

Run B—Run A was repeated except that the same proportion of solution and sorbent were mixed in a flask with a magnetic stirring bar for fifteen minutes at 65° C. and then filtered in accordance with the methodology of Run A. Analysis of the resultant filtrate revealed that the filtrate contained 51.43% dry solids of which 0.5% by weight consisted of the fatty alcohol residue. According to the technique utilized in Run B, about a 30% by weight reduction in residual fatty alcohol was achieved.

Run C was conducted in the same manner as Run B except that 4 grams of silicalite was mixed with 10 grams of solution for 15 minutes at 65° C. Analysis of Run C filtrate revealed a 51.47% dry solids content of which the fatty alcohol residue amounted to only 0.03% by weight. Run C illustrates that it is possible in accordance with the invention to provide surface active agents substantially free from fatty alcohol residues by removing more than 95% of the total fatty alcohol residue from the crude surfactant composition. This result can be achieved within a relatively short period of time without removing or adversely affecting the active surface agent component.

Run D—Run A was repeated employing a 10 gram solution which consisted of 50.15% water and 49.85% dry substance of which 98.63% consisted of the long-chain alkyl glycoside component, 0.85% dodecanol and 0.853% tridecanol. A one gram of the silicalite was contacted with the solution under ambient conditions for eight days. The solution was then filtered and the analysis thereof indicated a dry solids content of 49.9% of which 0.24% was dodecanol and 0.48% was tridecanol. In Run D the dodecanol and tridecanol contents were respectively reduced by more than 70% by weight and about 10% by weight.

A fixed bed system is anticipated as the most suitable method contemplated for removing residual contaminants from surfactant compositions. The fixed bed system may involve a vessel or container for the sorbent of a suitable construction to permit evacuation and pressurization with inert gases and equipped with heating means to regulate the adsorption and regeneration temperature. The fixed bed vessel can be equipped with a feed port as well as metering and pumping means to regulate the flow rate of surfactant composition through the fixed bed. The effluent port may be equipped with an automated monitoring device so as to monitor the lipophile concentrations in the effluent.

The automated monitoring device may be operatively integrated with the feed metering and pumping means. One or more fixed beds similarly equipped may be connected in series to provide a plurality of fixed beds.

The adsorption by the fixed bed may be continued until the fixed bed attains an unacceptable residue adsorption at which time the back-up fixed bed can be placed in operation. The first stage of the regeneration will advantageously remove as much of the unadsorbed residue and surfactant composition from the bed voids as is possible by purging the fixed bed down-flow with an inert gas such as nitrogen. After removing essentially all of the unadsorbed surfactant composition and residue from the fixed bed, the second stage of the desorption entails washing the bed with a desorbent (e.g. butanol).

The fixed bed wash is continued until substantially all of the residue is eluted from the bed. Thereafter (the third stage), the bed is suitably purged with nitrogen to remove the unadsorbed butanol from the fixed bed. The fixed bed, with nitrogen in the void space and adsorbed butanol, is then subjected to a sudden pressure decrease (e.g. 50 mm mercury vacuum at 75° C.) to volatilize and desorb the butanol from the silicalite bed. The butanol gas stream is then condensed. The n-butanol down-flow will be suitably monitored until no more butanol is detected at which time the vacuum is broken. The fixed bed is then adjusted to the residue adsorption temperature (e.g. 50° C.) and pressure (e.g. 1 atmosphere) and placed in operation by admitting a fresh feed of surfactant composition. In an integrated operation, the fatty alcohol residue may be recovered by conventional techniques and reused in the production of surfactant composition. Similarly, both the nitrogen purging gases and butanol may be purified by conventional techniques and recycled for further use in the manufacturing process.

What is claimed is:

1. A method for removing lipophilic residues from a surfactant composition comprised of surfactant molecules, lipophilic residue molecules of a molecular dimension less than the surfactant molecules and an effective amount of a liquid carrier to permit the adsorption of said lipophilic molecules from said surfactant composition with a hydrophobic adsorbent, said liquid carrier being either a non-polar organic solvent having a minimum molecular dimension greater than the maximum pore dimension of said hydrophobic adsorbent or a polar solvent having lower affinity for adsorption by said hydrophobic adsorbent than said lipophilic residue and said method comprising:
   (A) contacting said surfactant composition with a solid hydrophobic adsorbent characterized as having a maximum pore dimension sufficiently small to effectively preclude molecular adsorption of the surfactant molecules, said maximum pore dimension being less than 15 angstroms in size;
   (B) selectively adsorbing at least a portion of said lipophilic molecules from said surfactant composition; and
   (C) partitioning the adsorbent containing the adsorbed lipophilic molecules from the surfactant composition to provide a surfactant composition of a reduced lipophilic residue content.

2. The method according to claim 1 wherein the surfactant composition consists essentially of an alkyl glycoside mixture wherein the alkyl moiety contains at least six carbon atoms.

3. The method according to claim 1 wherein the liquid carrier is a solvent for said residue and has a minimum molecular dimension greater than the maximum pore dimension of the hydrophobic adsorbent.

4. The method of claim 1 wherein the liquid carrier is a polar solvent having a lower affinity for adsorption by said adsorbent than said lipophilic residue.

5. The method according to claim 1 wherein the surfactant consists essentially of a long-chain alkyl aldoside mixture represented by the structural formula; $R_fO(G)_n$ wherein "$R_f$" represents a lipophilic organo group containing a straight-chain or hydrocarbyl group of at least 6 carbon atoms; "G" is an aldosidic unit and "n" is a number having a value of at least 1.

6. The method according to claim 5 wherein the average value of "n" is less than three.

7. The method according to claim 5 wherein the active surfactant component consists essentially of a long-chain alkyl glycoside mixture of the formula: $R_fO(G)_n$ wherein "$R_f$" is a straight-chain hydrocarbyl moiety of at least six carbon atoms, "G" represents a glucosidic unit and "n" has an average value of less than ten.

8. The method according to claim 7 wherein "$R_f$" consists essentially of an alcoholic condensate of a monohydric alcohol comprised of 8 to 18 carbon atoms inclusive and "n" represents a number having an average value of less than five.

9. The method according to claim 7 wherein the lipophilic residue is a monohydric alcohol of 8 to 22 carbon atoms inclusive.

10. The method according to claim 9 wherein the liquid carrier is water.

11. The method according to claim 1 wherein the adsorbent is a hydrophobic adsorbent having porous channels measuring less than 10 angstroms in size.

12. The method according to claim 1 wherein the steps of contacting, selectively adsorbing and partitioning are accomplished by passing said surfactant composition through a fixed bed of the hydrophobic adsorbent.

13. The method according to claim 12 wherein the hydrophobic adsorbent has a pore dimension sufficiently small to preclude molecular adsorption of lipophilic molecules greater than 10 angstroms in size.

14. The method according to claim 1 wherein from about 4 to about 20 volumes of hydrophobic adsorbent (crystal volume basis) for each volume of lipophilic residue are used to adsorb said lipophilic residue from said surfactant composition.

15. The method according to claim 1 wherein the partitioned adsorbent is treated with an effective amount of an alkanol comprised of 2 to 5 carbon atoms inclusive to elute the lipophilic residue from said partitioned adsorbent.

16. The method according to claim 15 wherein the alkanol consists essentially of butanol.

17. The process of claim 1 wherein the adsorbent is a silica polymorph.

18. The process of claim 1 wherein the adsorbent is a hydrophobic zeolite.

* * * * *